United States Patent
Chebolu et al.

(10) Patent No.: US 9,801,092 B2
(45) Date of Patent: Oct. 24, 2017

(54) METHOD AND APPARATUS FOR CONTROLLING HEADER COMPRESSION FUNCTION OF TERMINAL IN A COMMUNICATION SYSTEM

(71) Applicant: Samsung Electronics Co., Ltd., Gyeonggi-do (KR)

(72) Inventors: Praveen Chebolu, Gyeonggi-do (KR); Abdulla Shaik, Bangalore (IN); Varun Bharadwaj, Bangalore (IN); Jai-Dong Kim, Gyeonggi-do (KR); Hyeun-Mok Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 42 days.

(21) Appl. No.: 14/744,934

(22) Filed: Jun. 19, 2015

(65) Prior Publication Data

US 2016/0183123 A1    Jun. 23, 2016

(30) Foreign Application Priority Data

Dec. 17, 2014    (KR) .................. 10-2014-0182406

(51) Int. Cl.
*H04W 4/00*    (2009.01)
*H04W 28/06*    (2009.01)
*H04L 29/06*    (2006.01)

(52) U.S. Cl.
CPC ............ *H04W 28/06* (2013.01); *H04L 69/04* (2013.01)

(58) Field of Classification Search
None
See application file for complete search history.

(56) References Cited

U.S. PATENT DOCUMENTS

| | | | |
|---|---|---|---|
| 2003/0026255 A1* | 2/2003 | Poeluev | H04L 69/04 370/392 |
| 2004/0073711 A1 | 4/2004 | Pelletier et al. | |
| 2007/0160059 A1* | 7/2007 | Poeluev | H04L 69/32 370/395.3 |
| 2011/0300889 A1* | 12/2011 | Lee | H04W 28/06 455/509 |
| 2012/0236862 A1* | 9/2012 | Furuta | H04L 69/22 370/392 |
| 2016/0112823 A1* | 4/2016 | Vrind | H04W 76/046 370/329 |
| 2016/0142518 A1* | 5/2016 | Raina | H04L 69/04 370/230 |
| 2016/0142937 A1* | 5/2016 | Balasubramanian | H04L 65/1016 370/328 |
| 2016/0261558 A1* | 9/2016 | Herrero | H04L 61/2592 |
| 2016/0352492 A1* | 12/2016 | De Wit | H04W 24/08 |

* cited by examiner

Primary Examiner — Otis L Thompson, Jr.
(74) Attorney, Agent, or Firm — The Farrell Law Firm, P.C.

(57) ABSTRACT

Methods, systems, and apparatuses (including, but not limited to, User Equipment (UE) and Base Stations) for a UE to control a packet header compression function in a communication system are described. In one method, if a predetermined condition is satisfied while the packet header compression function is enabled, the UE transmits a request for disabling the packet header compression function to a Base Station (BS), and, if a response is received from the BS, the UE disables the packet header compression function.

20 Claims, 3 Drawing Sheets

0000000: ROHC Enable/Disable indication packet.
1110: Padding or Add-CID octet
11110: Feedback
11111000: IR-DYN packet
1111110: IR packet
1111111: Segment

METHOD AND APPARATUS FOR CONTROLLING HEADER COMPRESSION FUNCTION OF TERMINAL IN A COMMUNICATION SYSTEM

PRIORITY

This application claims priority under 35 U.S.C. §119(a) to a Korean Patent Application filed in the Korean Intellectual Property Office on Dec. 17, 2014 and assigned Serial No. 10-2014-0182406, the entire disclosure of which is incorporated herein by reference.

BACKGROUND

1. Field of the Disclosure

The present disclosure relates to a technique for controlling a header compression function of a terminal in a communication system, and more particularly, to a method and apparatus for generating a control signal for controlling a header compression function and transmitting the control signal to an upper end by a terminal.

2. Description of the Related Art

To efficiently use limited resources on a radio link, packet header compression techniques have been proposed. One of them is Robust Header Compression (RoHC).

Voice over Long Term Evolution (VoLTE) has emerged as a promising solution to support real-time voice traffic in all Internet protocol (IP) networks. To substitute for conventional Circuit Switched (CS) voice service, VoLTE is based on MultiMedia Telephony (MMTel) and is standardized as an IP Multimedia Subsystem (IMS)-based Voice over Internet Protocol (VoIP) service.

During a VoLTE call, the UE exchanges packets configured with the User Datagram Protocol (UDP)/Transmission Control Protocol (TCP) and the Real-time Transport Protocol (RTP). If a User Equipment (UE) performing a VoLTE call supports RoHC, the UE receives information indicating whether RoHC is enabled or disabled from an evolved Node B (eNB) and the UE compresses or decompresses the packet headers accordingly.

Since, as described above, the eNB determines whether to enable or disable RoHC, the UE does not control its own RoHC function. Thus the UE cannot change its own RoHC function, even when contexts do not match between its RoHC decompressor and the RoHC compressor of the other party on the VoLTE call or when the UE should use another application, such as browsing, streaming, etc., which consumes less power because the UE has a small remaining amount of battery power.

As a result, the UE may experience discontinuation of an on-going service, or may not execute or maintain an intended service due to, for example, a rapid increase in the power consumption of the UE or an RoHC context mismatch.

Accordingly, there is a need for a method for a UE to control its own RoHC function in consideration of, for example, the channel state and/or the power state of the UE.

SUMMARY

The present disclosure addresses at least the above-mentioned problems and/or disadvantages and provides at least the advantages described below. One aspect of the present disclosure is to provide a method for a User Equipment (UE) to determine whether to enable or disable Robust Header Compression (RoHC) and to transmit the result of the determination to its serving evolved Node B (eNB). Another aspect of the present disclosure is to provide a method for a UE to configure information indicating whether RoHC is enabled or disabled, which the UE transmits to an eNB.

BRIEF DESCRIPTION OF THE DRAWINGS

The above and other aspects, features and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION OF EMBODIMENTS OF THE PRESENT DISCLOSURE

Figure 1:
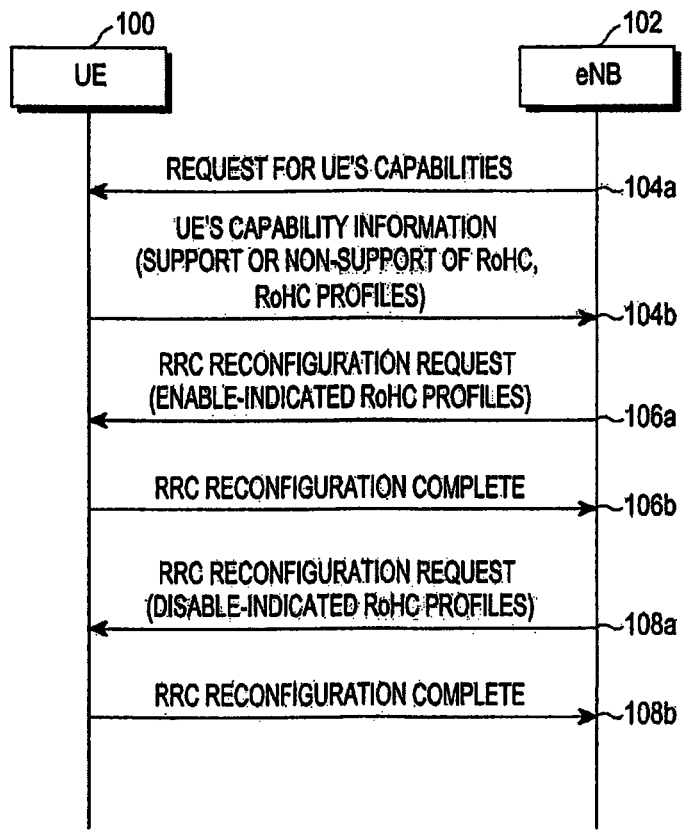
FIG. 1 is a diagram illustrating a signal flow of a conventional operation for setting a Robust Header Compression (RoHC) function.

Reference will be made to embodiments of the present disclosure with reference to the attached drawings. Like reference numerals denote the same components, although they are shown in different drawings. A detailed description of generally known functions and structures will be avoided in the present disclosure lest it obscure the subject matter of the present disclosure. In addition, although the terms used in the present disclosure are defined and implemented in consideration of functions of the present disclosure, the terms and the manner of implementation may be changed according to the intention of a user or an operator, usage, or custom. Therefore, the present disclosure must be understood, not simply by the actual terms used but also by the underlying meaning of each term.

Methods, systems, apparatuses (including, but not limited to, User Equipment and Base Stations), and semiconductor chip sets (including, but not limited to, broadband modem chip sets) according to embodiments of the present disclosure allow User Equipment (UE) to enable and/or disable a packet header compression function. In one aspect, a UE may request enabling and/or disabling of the Robust Header Compression (RoHC) function from an evolved NodeB (eNB). In another aspect, if it is determined that a current state of the UE satisfies a predetermined condition, a presently enabled RoHC function is disabled.

According to one aspect of the present disclosure, a method is provided for a User Equipment (UE) to control packet header compression function in a communication system, including transmitting a request for disabling the packet header compression function to a Base Station (BS), if a predetermined condition is satisfied while the packet header compression function is enabled; and, determining whether to discontinue execution of the packet header compression function according to whether a response to the request is received from the BS.

According to another aspect of the present disclosure, a method for controlling a packet header compression function of a User Equipment (UE) in a communication system, the method including, upon receipt of a request for disabling a currently-enabled packet header compression function from a UE, determining whether to accept the request; and transmitting a response indicating acceptance of the request to the UE, if it is determined to accept the request.

According to yet another aspect of the present disclosure, a User Equipment (UE) is provided which controls a packet header compression function in a communication system, including a transceiver; and a controller which, if a predetermined condition is satisfied while the packet header compression function is enabled, controls the transceiver to transmit a request for disabling the packet header compression function to a Base Station (BS), and, determines whether to discontinue execution of the packet header compression function according to whether a response to the request is received from the BS.

According to still another aspect of the present disclosure, a Base Station (BS) is provided to allow a User Equipment (UE) to control a packet header compression function in a communication system, including a transceiver; and a controller which, upon receipt of a request for disabling a currently-enabled packet header compression function from a UE during execution of the packet header compression function, determines whether to accept the request, and controls the transceiver to transmit a response indicating acceptance of the request to the UE, if it is determined to accept the request.

FIG. 1 is a diagram illustrating an example of a signal flow in a conventional method for setting a Robust Header Compression (RoHC) function.

Referring to FIG. 1, upon receipt of a User Equipment (UE) capability request from an evolved Node B (eNB) 102 in step 104a, UE 100 transmits its capability information to eNB 102 in step 104b. The capability information includes information indicating whether the UE 100 supports the RoHC function and RoHC profiles indicating RoHC applied targets. A RoHC profile may indicate the Internet Protocol (IP)/User Datagram Protocol (UDP)/Real-time Transmission Protocol (RTP) or a combination of IP/UDP/RTP such as the IP/UDP, compression of the IP/TCP, and compression of a header with the IP only, as RoHC function applied targets, where the targets represent ROHC applied entities such as UE/Device or enodeB only possible. The eNB 102 may determine whether to enable or disable RoHC for the UE 100 during Radio Resource Control (RRC) reconfiguration in the Radio Bearer (RB) establishment procedure. In general, whether to enable or disable RoHC may be determined differently for each RB. For convenience of description, it is assumed herein that the RB is for a Voice over Long Term Evolution (VoLTE) call.

Specifically, the eNB 102 determines whether the UE 100 supports RoHC from the capability information about the UE 100. If the eNB 102 determines that the UE 100 supports RoHC, the eNB 102 determines whether to enable or disable the RoHC function of the UE 100. If the eNB 102 determines to enable the RoHC function of the UE 100, the eNB 102 transmits an RRC reconfiguration request to the UE 100 in step 106a.

The RRC reconfiguration request from the eNB includes an RoHC profile indicating an RoHC function applied target and information about the time for the UE to start the RoHC function. Upon receipt of the RRC reconfiguration request in step 106a, the UE 100 performs an RRC reconfiguration procedure according to information acquired from the RRC reconfiguration request. Once the RRC reconfiguration is completed, UE 100 transmits an RRC reconfiguration complete message, indicating completion of the RRC reconfiguration procedure, to the eNB 102 in step 106b.

UE 100 starts, or equivalently enables, the RoHC function at the time indicated in the RRC reconfiguration request.

If, at some point while the RoHC function of UE 100 is enabled, the eNB 102 determines to discontinue the ongoing RoHC function, the eNB 102 transmits an RRC reconfiguration request without an RoHC execution command to the UE 100, as shown in step 108a of FIG. 1. Then the UE 100 performs RRC reconfiguration according to the RRC reconfiguration request and transmits an RRC complete message to the eNB 102 in step 108b.

In the conventional operation for setting the RoHC function described above in reference to FIG. 1, the eNB is responsible for determining whether a legacy UE is supposed to execute the RoHC function, and then commands the UE in accordance with that determination. Accordingly, the UE may end up performing the RoHC function according to the eNB's determination and command, even though the UE is placed in a situation in which it is difficult for the UE to perform the RoHC function.

Accordingly, an embodiment of the present disclosure provides a method for a UE to request the enabling and/or disabling of the RoHC function. In a specific embodiment, the UE requests disabling of the RoHC function if a predetermined condition is satisfied.

According to an embodiment of the present disclosure, there are three predetermined conditions for requesting the disabling of the (currently-enabled) RoHC function. In this example, the three conditions are based on current resource problems for maintaining the RoHC function, but a predetermined condition according to the present disclosure may involve any factor concerning a current state of the UE, the eNB, the communication system, the environment, etc.

In this embodiment, the first condition is that the UE has a poor signaling state or an RoHC context required for RoHC decompression during decoding is damaged or lost.

The second condition is that the channel state of a lower layer is poor, for example, the Block Error Rate (BLER) and Carrier to Interference and Noise Ratio (CINR) are poor or granted radio bearers assigned by the eNB are insufficient.

Finally, the third predetermined condition is that the UE has insufficient remaining battery power. When the RoHC function is executed, power consumption increases rapidly due to checksum calculation, encoding/decoding, and RoHC packet configuration involved in the RoHC execution. Turning off the RoHC function would allow the UE to operate for a longer period of time. Also, if the UE needs to perform a higher priority operation, such as an emergency call, an embodiment of the present disclosure could ensure that resources are not consumed on the RoHC function for a lower priority communication.

In this embodiment, if any one of the above three predetermined conditions are satisfied, the UE requests disabling of the RoHC function. It is to be understood that predetermined conditions according to embodiments of the present disclosure are not limited to the above conditions.

According to an embodiment of the present disclosure, the UE, after the RoHC function is disabled in response to its request, monitors the status of the UE, such as, for example, the channel environment. If the predetermined condition is no longer satisfied, e.g., if the channel environment becomes good, the UE requests resumption of the RoHC function from the eNB. According to another embodiment, the UE may determine whether to enable the RoHC function based on current conditions, regardless of whether the RoHC function is or was previously enabled. According to yet another embodiment, the UE transmit information about a result of the determination to the eNB, instead of transmitting an enable/disable request.

According to the embodiment of the present disclosure discussed above, if at least one of the above three conditions is satisfied while the RoHC function of a UE is enabled, the UE requests discontinuation of the on-going RoHC function from the eNB.

Figure 2:
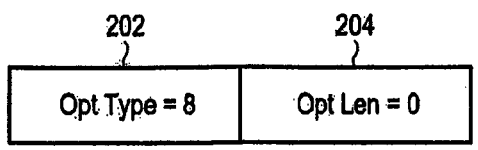
FIG. 2 illustrates a feedback format according to a first embodiment of the present disclosure.

FIG. 2 illustrates a legacy feedback format configured according to a first embodiment of the present disclosure. In the first embodiment, the legacy feedback format is configured to include a value indicating a request for discontinuation of the on-going RoHC execution.

Referring to FIG. 2, if an Option (Opt) Length 204 set to a value indicating a UE's request for enabling or disabling RoHC is included in a legacy feedback format 200, an Option (Opt) Type 202 is set to '8'. The Opt Length field may be one bit. If the bit is '0', this indicates that the UE requests RoHC disable and if the bit is '1', this indicates that the UE requests RoHC enable.

Figures 3, 4:
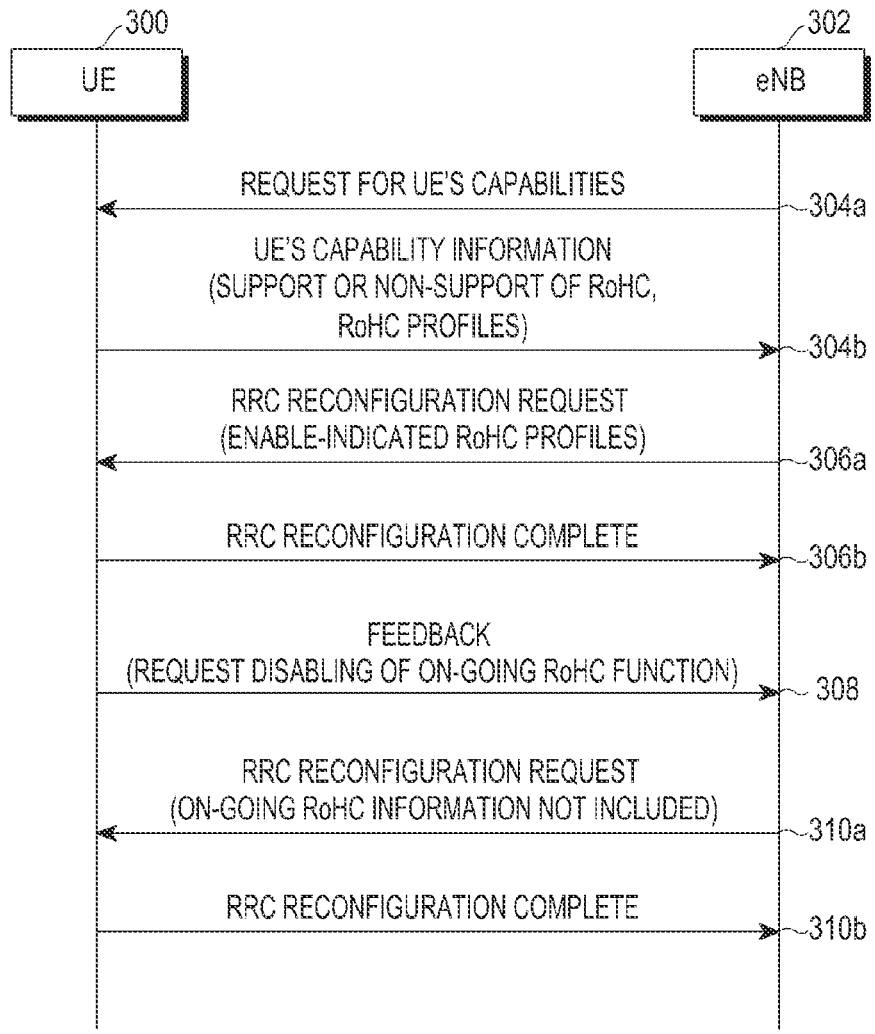
FIG. 3 is a flowchart illustrating an operation for a User Equipment (UE) to determine whether to enable or disable the RoHC function and to request the enabling or disabling of the RoHC function from an evolved Node B (eNB), according to an embodiment of the present disclosure.
FIG. 4 illustrates different values for the packet type field in a RoHC message header according to a second embodiment of the present disclosure.

FIG. 3 is a diagram illustrating a signal flow in which a UE requests the disabling of a currently-enabled RoHC function based on its own determination, according to an embodiment of the present disclosure.

Referring to FIG. 3, steps 304a to 306b are performed in a similar manner as steps 104a to 106b of FIG. 2 and thus will not be described herein. Accordingly, it is assumed that the RoHC function of UE 300 has been enabled, for example, on a bearer established for a VoLTE call in steps 306a and 306b.

At this point, the UE determines to request that the enabled RoHC function be disabled. This determination could be based on any number of factors. For example, using the embodiment described above, UE 300 might determine that at least one of first, second, and third predetermined conditions have been satisfied.

Having determined to request the disabling of the currently-enabled RoHC function, the UE 300 transmits such a request for discontinuation of the on-going ROHC function to eNB 302. For example, the UE 300 may transmit a feedback message configured as described above with reference to the embodiment of FIG. 2 to the eNB 302. The feedback includes an Opt Type set to 8 indicating that an Opt Length field set to '0' requesting RoHC disable is included.

Upon receipt of the feedback, the eNB 302 determines whether to accept the RoHC disable request of the UE 300. If the eNB 302 accepts the RoHC disable request of the UE 300, the eNB 302 transmits an RRC reconfiguration request without an RoHC enable command to the UE 300 in response to the feedback in step 310a (which is the same as step 108a in FIG. 1). The UE 300 transmits an RRC reconfiguration complete message to the eNB 302 in response to the RRC reconfiguration request in step 310b.

While not shown in FIG. 3, if the eNB 302 determines to reject UE 300 s RoHC disable request sent in step 308, the eNB 302 does not transmit a response to the feedback (i.e., step 310a is not performed). Accordingly, when the UE 300 fails to receive a RRC Request from the eNB 302, the UE 300 continues the on-going RoHC function (i.e., step 310b is not performed).

FIG. 4 illustrates different values for the packet type field in a RoHC header configured according to a second embodiment of the present disclosure. In the second embodiment, a new RoHC message format is used by the UE to request enabling/disabling of the RoHC function. Specifically, a new value indicating an enable/disable request may be used for the RoHC packet type field in the RoHC message header in the second embodiment of the present disclosure.

More specifically, in an embodiment of the present disclosure, a reserved value of the RoHC packet type, '0000000', is used by the UE to make an RoHC packet indicate a RoHC enable or disable request. Referring to FIG. 4, the other values of the RoHC packet type remain the same, i.e., if the RoHC packet type of the RoHC header has a value of '1110', it indicates that the RoHC packet is 'padding' or 'Add-CID (Context Identifier) octet'. If the RoHC packet type is '11110', it indicates that the RoHC packet is a feedback message, such as discussed in reference to FIG. 2.

If the RoHC packet type is '11111000', this indicates that the RoHC packet is an IR_DYN (Initialization and Refresh_Dynamic) packet. If the RoHC packet type is '1111110', this indicates that the RoHC packet is an IR packet. If the RoHC packet type is '1111111', this indicates that the RoHC packet is a segment.

Figure 5:
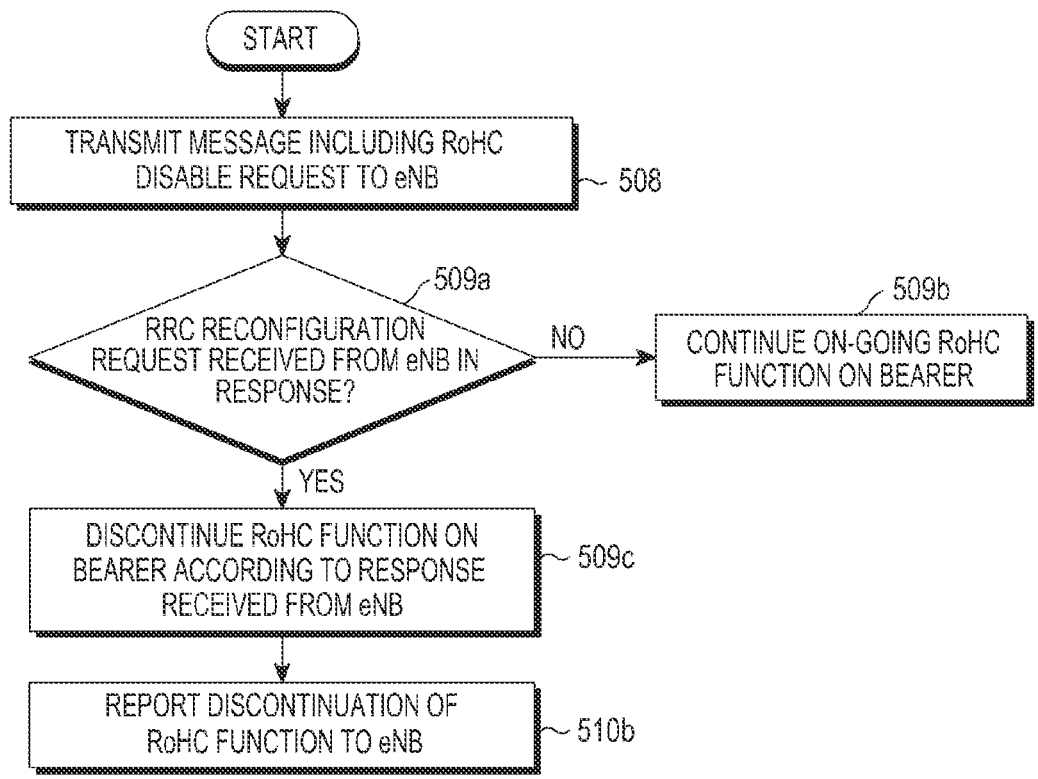
FIG. 5 is a flowchart illustrating an operation of a UE according to an embodiment of the present disclosure.

FIG. 5 is a flowchart illustrating an operation of a UE according to an embodiment of the present disclosure.

In FIG. 5, it is assumed that (1) the RoHC function is presently enabled, and (2) the UE has determined to request disabling of the currently-enabled RoHC function. The UE may have made the determination in (2) for any number of reasons, including, using the embodiment described above, if at least one of the afore-described first, second, and third predetermined conditions is satisfied. In step 508, the UE transmits a message including an RoHC disable request to its serving eNB. The message including the RoHC disable request may be configured as illustrated in FIG. 2 or FIG. 4.

In step 509a, the UE awaits reception of a response to its message bearing the disable request from the eNB. If the UE fails to receive the response from the eNB in step 509a, the RoHC function remains enabled in step 509b.

If the eNB sends an RRC reconfiguration request in response to the disable request in step 509a, the UE disables the RoHC function on the corresponding bearer according to the RRC reconfiguration request in step 509c. Once the RoHC function is disabled, the UE transmits an RRC reconfiguration complete message to the eNB, reporting the discontinuation of the RoHC execution in step 510b.

Figure 6:
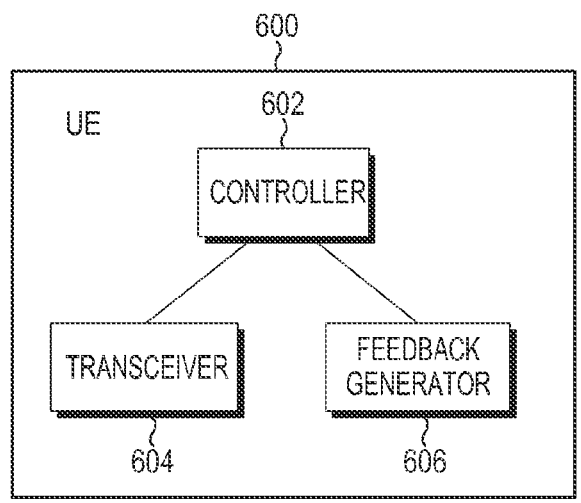
FIG. 6 is a block diagram of a UE according to an embodiment of the present disclosure.

FIG. 6 is a block diagram of a UE according to an embodiment of the present disclosure. UE 600 according to this embodiment of the present disclosure includes controller 602, transceiver 604, and feedback generator 606. These and the other components of the UE 600 may be incorporated into a single unit or may be divided into sub-units according to various embodiments of the present disclosure. The structure and architecture may vary according to, for example, an operator's intention.

Referring to FIG. 6, it is assumed that the UE 600 supports an RoHC function. If the RoHC function is currently enabled in UE 600 according to the afore-described steps 304a to 306b of FIG. 3 and the controller 602 determines that a predetermined condition is satisfied (such as at least one of the first, second, and third conditions described above), the controller 602 requests RoHC disable by controlling transceiver 604 to transmit an RoHC disable request to the eNB. The RoHC disable request may be configured according to the embodiments illustrated in FIG. 2 or FIG. 4.

Upon receipt of an RRC reconfiguration request in response to the RoHC disable request from the eNB, the controller 602 releases the RoHC function and then notifies the eNB of the RoHC release through the transceiver 604. If the controller 602 fails to receive a response to the RoHC disable request from the eNB, the RoHC function continues.

According to the embodiment of the present disclosure as described above, if a state of the UE satisfies a predetermined condition, the UE transmits an RoHC disable request. In one embodiment, the UE may efficiently use remaining battery power for an intended usage. Specifically, the predetermined condition is if a user of the UE attempts an emergency call with remaining battery power of 10% in the UE. In this predetermined condition is satisfied, the UE requests RoHC disable and, if the eNB accepts the RoHC disable request, the emergency call may be lengthened further with the resulting saved remaining battery power (about 20 maH is saved from discontinuation of the RoHC function).

Table 1 below lists the amount of battery power saved when the RoHC function is disabled at the request of the UE according to an embodiment of the present disclosure.

TABLE 1

| Scenario | ROHC enabled | ROHC Disabled |
| --- | --- | --- |
| 5 mins VoLTE call | 210 maH | 185 maH |
| CPU Idle | 50% CPU Idle | 60% CPU Idle |

Referring to Table 1, the UE's battery power consumptions are listed for RoHC enabled and RoHC disabled, respectively, in two scenarios, that is, a VoLTE call for 5 minutes and a CPU idle state. It is noted that power consumption is reduced by RoHC disabled, compared to RoHC enabled, in both scenarios.

If extra power is saved by disabling RoHC in the CPU idle state, the UE may perform another higher-priority service using the extra power.

If the battery condition is low, the UE transmits an RoHC disable request to the eNB according to the embodiment of the present disclosure, thus preventing loss of signaling messages as battery condition will improve when the RoHC scheme disabled.

As is apparent from the foregoing description, since a UE determines whether to enable or disable RoHC according to a predetermined condition and transmits either a disable request or information indicating a result of the determination to an eNB, the UE can execute or discontinue its RoHC function in consideration of, for example, signaling, a channel state, and remaining battery power of the UE. Therefore, for example, the power of the UE can be managed efficiently.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. A method for a user equipment (UE) to control a packet header compression function in a communication system, comprising:
transmitting a request for disabling the packet header compression function to a Base Station (BS);
receiving a Radio Resource Control (RRC) reconfiguration request in response to the request from the BS; and
transmitting an RRC reconfiguration complete message to the BS.

2. The method of claim 1, wherein the RRC reconfiguration request does not include a robust header compression enable command.

3. The method of claim 1, wherein the request for disabling the packet header compression function is included in a feedback packet having at least one of a value as an option type and/or a value as an option length indicating the request for disabling the packet header compression function.

4. The method of claim 1, wherein the UE transmits the request for disabling the packet header compression function when at least one of loss of context of the packet header compression function, a channel state, and/or a remaining battery power amount of the UE occurs.

5. The method of claim 1, wherein the request for disabling the packet header compression function is included in a packet having a value as a packet type indicating the request for disabling the packet header compression function.

6. A method for controlling a packet header compression function of a user equipment (UE) in a communication system, the method comprising:
receiving, by a base station (BS), a request for disabling a currently-enabled packet header compression function from the UE;
transmitting, by the BS, a Radio Resource Control (RRC) reconfiguration request indicating acceptance of the request to the UE in response to the request; and
receiving an RRC reconfiguration complete message from the UE.

7. The method of claim 6, wherein the RRC reconfiguration request does not include a robust header compression enable command.

8. The method of claim 6, wherein the request for disabling the packet header compression function is included in a packet having a value as a packet type indicating the request for disabling the packet header compression function.

9. The method of claim 6, wherein the UE transmits the request for disabling the packet header compression function when at least one of loss of context of the packet header compression function, a channel state, and/or a remaining battery power amount of the UE occurs.

10. The method of claim 6, wherein the request for disabling the packet header compression function is included in a feedback packet having at least one of a value as an option type and/or a value as an option length indicating the request for disabling the packet header compression function.

11. A User Equipment (UE) which controls a packet header compression function in a communication system, the UE comprising:
a transceiver; and
a controller configured to control the transceiver to transmit a request for disabling the packet header compression function to a Base Station (BS), and determine discontinuing of execution of the packet header compression function based on whether a response to the request is received from the BS,
wherein the request is included in a feedback packet having at least one of a value as an option type and/or a value as an option length indicating the request for disabling the packet header compression function.

12. The UE of claim 11, wherein a Radio Resource Control (RRC) reconfiguration request does not include a robust header compression enable command.

13. The UE of claim 11, wherein if the response to the request for disabling the packet header compression function is received from the BS, the controller discontinues the execution of the packet header compression function.

14. The UE of claim 11, wherein the UE transmits the request for disabling the packet header compression function when at least one of loss of context of the packet header compression function, a channel state, and a remaining battery power amount of the UE occurs.

15. The UE of claim 11, wherein the option length of the feedback packet is 0.

16. A Base Station (BS) to allow a User Equipment (UE) to control a packet header compression function in a communication system, the BS comprising:
   a transceiver; and
   a controller configured to upon receipt of a request for disabling a currently-enabled packet header compression function from the UE during execution of the packet header compression function, control the transceiver to transmit a Radio Resource Control (RRC) reconfiguration request to the UE in response to the request.

17. The BS of claim 16, wherein the request for disabling the packet header compression function is included in a packet having a value as a packet type indicating the request for disabling the packet header compression function.

18. The BS of claim 16, wherein if the response is transmitted, the packet header compression function is discontinued.

19. The BS of claim 16, wherein the UE transmits the request for disabling the packet header compression function when at least one of loss of context of the packet header compression function, a channel state, and a remaining battery power amount of the UE occurs.

20. The BS of claim 16, wherein the request for disabling the packet header compression function is included in a feedback packet having at least one of a value as an option type and/or a value as an option length indicating the request for disabling the packet header compression function.

* * * * *